Oct. 27, 1925.
T. G. SCHMEISER
DRAWBAR
Filed July 22, 1924
1,559,008
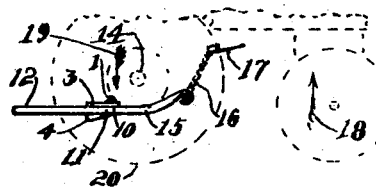
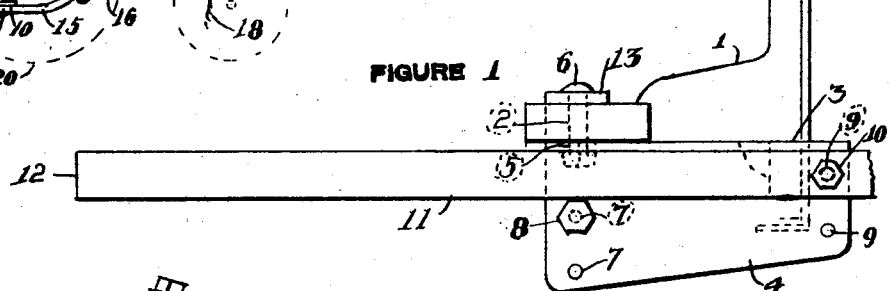
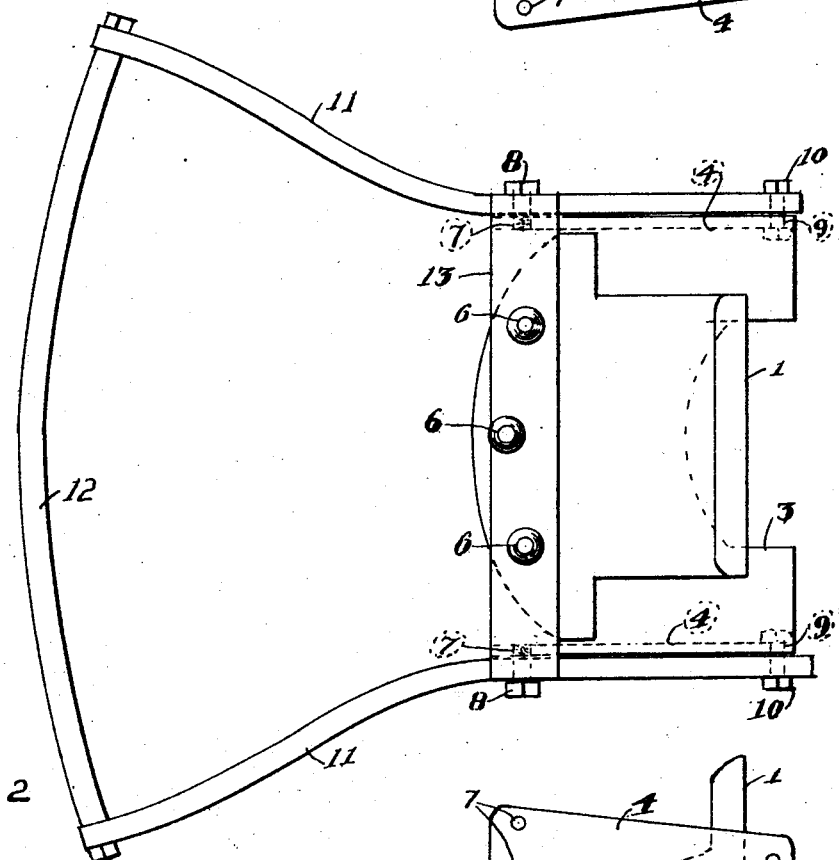
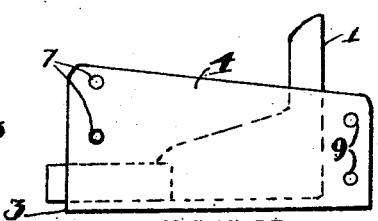
INVENTOR
Theodore G. Schmeiser
BY John A. Naismith
ATTORNEY Patented Oct. 27, 1925.

1,559,008

UNITED STATES PATENT OFFICE.

THEODORE G. SCHMEISER, OF DAVIS, CALIFORNIA.

DRAWBAR.

Application filed July 22, 1924. Serial No. 727,431.

*To all whom it may concern:*

Be it known that I, THEODORE G. SCHMEISER, a citizen of the United States, and a resident of Davis, in the county of Yolo and State of California, have invented certain new and useful Improvements in Drawbars, of which the following is a specification.

It is one object of the present invention to provide an attachment for a tractor drawhead that will permit a vertical pivotal movement of the draw-bar carried thereby, whereby to maintain an even draft on the machine drawn, and prevent the draw-bar connection from digging into the ground when the front wheels of the tractor are raised off of the ground through an excessive backward and downward pull on its rear end.

It is another object of the invention to provide a structure of the character indicated that will automatically throw out the clutch on the tractor when the pull on the tractor is so great as to lift the front wheels off of the ground.

It is a still further object of the invention to provide an attachment wherein the pivotal points of the draw-bar may be vertically adjusted within given limits.

Finally, it is an object of the invention to provide a device of the character indicated which is composed of few parts, is economical to manufacture, strong, durable, and highly efficient in its practical application.

In the drawing:—

Figure 1 is a side elevation of the device mounted upon a tractor draw-head.

Figure 2 is a plan view of the structure and its mounting as shown in Figure 1.

Figure 3 is a side elevation of the drawbar plate reversed.

Figure 4 is a diagrammatical illustration of the draw-bar as mounted on a tractor and connected to the clutch thereof.

Referring more particularly to the drawing, 1 indicates the draw-head of a tractor of the Fordson type or similar construction provided with orifices 2 for connecting a machine thereto.

In effecting my invention I provide a plate 3 having side flanges 4 formed at right angles thereto and provided with orifices 5 adapted to align with orifices 2 in draw-head 1 so that it may be rigidly mounted thereon as by bolts 6.

The forward portions of flanges 4 are preferably made wider than the rear portions and are tapped at several points in vertical alignment as at 7 to receive threaded bolts 8.

Orifices 9 are formed in the rear portion of flanges 4 to receive bolts 10 upon which the side elements 11 of draw-bar 12 are pivotally mounted.

The plate being mounted on the drawhead 1 with the flanges 4 extending downwardly the draw-bar arms 11 may be mounted thereon by passing bolts 10 through the uppermost orifices 9 or the lowermost of said orifices as conditions may require. When mounted upon plate 3 these arms are limited in their vertical pivotal movement by screwing the bolts 8 into the upper or lower orifices 7 as the case may be, and by bolting bar 13 on to the top of the drawhead 1 as shown, to project over the said arms 11.

The flanges 4 project forwardly of the draw-head 1 so that the pivotal connections of the draw-bar 12 thereto are just below the tractor axle 14 and slightly to the rear thereof, thereby greatly reducing the tendency of the tractor to turn a backward somersault when subjected to excessive pull from the rear.

I have herein shown one arm 11 or drawbar 12 extending forwardly a distance under the tractor axle to form a lever 15 to which a chain 16 is attached, the other end of the chain being attached to the clutch pedal 17 of the tractor.

The result of this construction is, that whenever the machine drawn by the tractor encounters an obstacle of sufficient resistance to cause the tractor to rise up in front, this upward pivotal movement about its rear axle 14 as indicated by the arrow 18, causes a downward movement of pivotal point 10 as indicated by arrow 19. Since the drawbar is held taut between the machine being drawn and the pivotal point 10 the lever arm 15 is forced downwardly, thereby throwing out clutch 17 through the medium of chain 16. This action, of course, automatically disconnects the power from the drive wheels 20 and the several parts at once resume their normal positions.

In Figure 3 it is shown that the limit of vertical adjustment of the arms 11 may be practically doubled with this device by merely inverting the plate 3 on draw-head 1.

I am aware that I am not the first to provide a draw-bar structure with forwardly extending pivotal connecting points as 10, therefore I do not claim such broadly. I do claim as new, however, the cut and formed reversible plate with means for effecting a vertical adjustment of the pivotal points of the draw-bar, and the automatic operation of the clutch by the pivotal movement of the tractor relative to the draw-bar.

I claim:—

1. A draw-bar structure comprising a plate adapted to be mounted upon a tractor draw-head and having side flanges formed thereon, means for pivotally mounting a draw-bar arm at one end of each flange, and means for limiting the pivotal movement of the draw-bar arms arranged at the other end of each flange.

2. A draw-bar structure comprising a sheet-metal plate having orifices formed therein to align with the orifices formed head of a tractor, and having end portions thereof turned at right angles thereto to form parallel flanges, means for pivotally mounting a draw-bar arm at one end of each flange, and means for limiting the pivotal movement of the draw-bar arms arranged at the other end of each flange.

3. A draw-bar structure comprising a plate adapted to be mounted upon a tractor draw-head and having side flanges formed thereon, vertically adjustable means for pivotally mounting a draw-bar arm at one end of each flange, and vertically adjustable means for limiting the pivotal movement of the draw-bar arms arranged at the other end of each flange.

THEODORE G. SCHMEISER.